United States Patent [19]

Eckberg

[11] Patent Number: 5,139,816
[45] Date of Patent: Aug. 18, 1992

[54] COATED OPTICAL FIBERS

[75] Inventor: Richard P. Eckberg, Saratoga Springs, N.Y.

[73] Assignee: General Electric Company, Waterford, N.Y.

[21] Appl. No.: 736,860

[22] Filed: Jul. 29, 1991

Related U.S. Application Data

[63] Continuation of Ser. No. 38,474, Apr. 13, 1987, Pat. No. 5,054,883.

[51] Int. Cl.$^5$ .............................................. B05D 3/06
[52] U.S. Cl. ...................................... 427/54.1; 427/163; 427/386; 427/387
[58] Field of Search ................ 385/145; 427/54.1, 163, 427/387, 386; 428/391, 392

[56] References Cited

U.S. PATENT DOCUMENTS

| | | | |
|---|---|---|---|
| 3,220,972 | 11/1965 | Lamoreaux | 260/46.5 |
| 3,715,334 | 2/1973 | Karstedt | 260/46.5 |
| 3,775,452 | 11/1973 | Karstedt | 260/429 |
| 3,814,730 | 6/1974 | Karstedt | 260/46.5 |
| 4,026,705 | 5/1977 | Crivello et al. | 96/27 |
| 4,116,786 | 9/1928 | Hodakowski | 427/44 X |
| 4,133,915 | 1/1979 | Noethe et al. | 427/160 |
| 4,208,471 | 6/1980 | Bresak et al. | 428/447 |
| 4,279,717 | 7/1981 | Eckburg et al. | 528/12 X |
| 4,344,669 | 8/1982 | Uchida et al. | 428/375 X |
| 4,348,462 | 9/1982 | Chung | 628/412 |
| 4,370,358 | 1/1983 | Hayes et al. | 427/54.1 |
| 4,451,634 | 5/1984 | Hatanaka et al. | 528/24 |
| 4,472,021 | 9/1984 | Ansel et al. | 350/96.23 |
| 4,486,504 | 12/1984 | Chung | 428/412 |
| 4,496,210 | 1/1985 | Ansel et al. | 350/96.3 |
| 4,558,147 | 12/1985 | Eckberg et al. | 556/427 |

FOREIGN PATENT DOCUMENTS 8400424 2/1984 European Pat. Off. .

Primary Examiner—Michael Lusignan

[57] ABSTRACT

Novel coating compositions for coating optical fibers are provided which utilize ultraviolet radiation-curable epoxy-functional or vinyl-functional diorganopolysiloxanes to form flexible, loosely adherent, and environmentally stable primary coatings. Such coatings assist in preventing attenuation of light impulses transmitted through the core fiber or reduce the level of signal "noise". Use of the particular coating compositions allows high-speed production of such optical fibers.

15 Claims, No Drawings

COATED OPTICAL FIBERS

This application is a division, of application Ser. No. 038,474, filed Apr. 13, 1987.

This invention relates to coated optical fibers. More particularly, it relates to a method for applying ultraviolet radiation-curable silicone compositions to an optical fiber to provide a flexible, loosely adhering coating thereon which prevents attenuation of light impulses transmitted through the fiber.

BACKGROUND OF THE INVENTION

The emerging field of lightwave telecommunications makes use of light to transmit information through a transparent medium in a similar way to electricity through copper or aluminum wire. Since the information-carrying capacity of electromagnetic radiation increases with frequency, the communications traffic that could be accommodated in the bandwidth of visible radiation (light) is potentially many thousands of times that of radio communications.

Since the discovery of a suitable light source in the laser around 1960, the only technical obstacle to lightwave communications over great distances was the development of a suitable transmission medium. Air, for example, although penetrable by light, was unsuitable because rain, fog, and other atmospheric conditions could weaken (or "attenuate") the light signal. Development of the glass fiber lightguide, or optical fiber, provided an excellent and relatively inexpensive transmission medium.

Modern optical fibers typically consist of a core of high transparency silica glass, which transmits the light, surrounded by a transparent coating of lower refractive index than the core. The coating acts as an internal mirror, reflecting the light back into the core and thus preventing loss of the light signal outside the optical path.

While the lower refractive index coating theory has provided serviceable lightguides for relatively short-distance telecommunications (e.g., building-to-building or intramural), for long-distance telecommunications (e.g., transcontinental), where many lightguides may be bundled together, the problem of signal "noise" becomes more important than signal attenuation. To a particular information-carrying lightwave, any incidental lightwaves (carrying other information) or signals disrupting to the first lightwave are "noise" from which the desired information must be extracted. It has been found that signal noise can be minimized in lightwave transmissions by coatings of higher refractive index than the core fiber.

There is thus a continuing search for coating materials having either a higher or a lower refractive index than the core fiber material For silica glass optical fibers, the reference point is 1.47, the refractive index of silica glass fiber. Suitable materials will have refractive indices lower, preferably less than 1.45, or higher, preferably greater than 1.50.

In the production of fiber optics cable for telecommunications, the material used for primary coatings must be very flexible, must not adhere too closely to the glass fiber core (to permit joining and other manipulations), and must maintain its integrity and optical characteristics in changeable environments, including temperature cycles of from $-60°$ to $+80°$ C.

Many fiber optics producers have adopted heatcurable polydimethylsiloxane coating compositions as the primary lightguide coating. The uncoated optical fiber is typically drawn through the silicone composition, then through an eight-inch oven at 800° C. for curing. The time required to fully cure the silicone composition has become the limiting factor in increasing line speeds in producing optical fibers: Since higher oven temperatures (or longer ovens) cause oxidation of the silicone and also begin to affect the drawn fibers, line speeds cannot be increased beyond about 30 meters/minute with commercially available thermally cured silicone coatings.

The desire to attain higher production speeds has led optical fiber producers to investigate ultraviolet radiation (UV)-curable materials, but a coating composition having a combination of properties comparable to the silicone materials has not as yet been found.

It has now been discovered that certain UV-curable polysiloxane compositions provide novel coating materials for optical fibers which exhibit the desired combination of properties for optical fiber cladding layers. The discovery includes both low refractive index and high refractive index compositions, all of which cure rapidly on brief exposure to ultraviolet radiation, thus offering significant advantages in safety, cure rate, and cost over thermally cured silicone materials.

SUMMARY OF THE INVENTION

Accordingly, it is an object of the present invention to provide a faster curing alternative to thermally cured polydimethylsiloxane compositions for the primary coating layer of optical fibers.

It is a further object of the present invention to provide a coating material for optical fibers which is easily and safely applied, and which may be cured by brief exposure to ultraviolet radiation.

It is a further object of the present invention to provide novel low refractive index coating compositions and high refractive index coating compositions.

It is a further object of the present invention to provide coated optical fibers which are efficiently and inexpensively produced and can be adapted to a wide variety of lightwave telecommunications uses.

It is a further object of the present invention to provide a method for applying a primary coating to an optical fiber core which will allow increased production line speeds while providing a cured coating which is flexible, not closely adherent to the core fiber, and capable of withstanding dramatic changes in environmental conditions.

These and other objects are accomplished herein by an ultraviolet radiation-curable coating composition comprising (A) a diorganopolysiloxane comprising units of the formula RR'SiO, wherein R is hydrogen or a monovalent hydrocarbon radical of from 1 to 8 carbon atoms and R' is hydrogen, a monovalent hydrocarbon radical of from 1 to 20 carbon atoms or a monovalent organic radical of from 2 to 20.carbon atoms having vinyl or epoxy functionality, and (B) a catalytic amount of a photoinitiator.

Also contemplated by the present invention is an optical fiber comprising:

(A) a core of high transparency silica glass; and (B) a coating layer deposited on said core comprising an ultraviolet radition-curable silicone coating composition comprising (i) a diorganopolysiloxane comprising units of the formula RR'SiO, wherein R is hydrogen or a monovalent hydrocarbon radical of from 1 to 8 carbon atoms and R' is hydrogen, a monovalent hydrocarbon radical of from 1 to 20 carbon atoms or a monovalent organic radical of from 2 to 20 carbon atoms having vinyl or epoxy functionality, and (ii) a catalytic amount of a photo-initiator; said coating layer having a refractive index higher or lower than said silica glass.

Another feature of the present invention is a method for the high-speed production of an optical fiber comprising:

(1) Applying to a core fiber of high transparency silica glass an ultraviolet radiation-curable silicone coating composition comprising (i) a diorganopolysiloxane comprising units of the formula RR'SiO, wherein R is hydrogen or a monovalent hydrocarbon radical of from 1 to 8 carbon atoms and R' is hydrogen, a monovalent hydrocarbon radical of from 1 to 20 carbon atoms or a monovalent organic radical of from 2 to 20 carbon atoms having vinyl or epoxy functionality, and (ii) a catalytic amount of a photoinitiator; and (2) Exposing said coated core fiber to ultraviolet radiation of sufficient intensity and for a sufficient period of time to cure said coating composition on said core fiber to form a flexible, loosely adherent, environmentally stable coating thereon, which coating layer is of a lower or higher refractive index than the core fiber.

A method for advantageously controlling the refractive index and viscosity of the disclosed polysiloxane coating materials is also contemplated.

For the purposes of the present invention, the term "loosely adherent" refers to a desired property of the primary coating layer over a glass optical fiber meaning that the coating layer does not adhere so strongly to the core fiber as to inhibit the common mechanical operations performed with optical fibers, such as joining. The term does not refer to the optical relationship between the core and the cladding (primary coating) layer. The term "environmentally stable" refers to the ability of the coating material of the present invention to maintain its integrity and optical characteristics through environmental changes to which fibers are routinely exposed, particularly cycles in temperature between the extremes of about −60° C. and +80° C.

DETAILED DESCRIPTION OF THE INVENTION

The coated optical fibers of the present invention are prepared by applying a rapidly curable, UV-curable, epoxy-functional or vinyl-functional silicone coating composition to a transparent silica glass fiber and then subjecting it briefly to ultraviolet radiation. The coated optical fibers of the present invention exhibit all of the desired properties seen in thermally cured polydimethylsiloxane-coated fibers while providing the increased production capability, reduced energy expenses, and safety of ultraviolet radiation curing.

Ultraviolet radiation (UV) is one of the most widely used types of radiation because of its low cost, ease of maintenance, and low potential hazard to industrial users. UV-curable compositions not only exhibit a very short curing time but also avoid the high energy costs, environmental restrictions and safety hazards associated with the use of heat-curable materials.

The UV-curable compositions employed in the present invention are basically comprised of two components: (i) an epoxy-functional or vinyl-functional organopolysiloxane base polymer combined with (ii) a photoinitiator capable of promoting rapid cure of the composition on exposure to ultraviolet radiation.

The epoxy-functional organopolysiloxane base polymers contemplated by the present invention are comprised of units having the general formula RR'SiO, where R is hydrogen or a monovalent hydrocarbon radical of from 1 to 8 carbon atoms and where R' can be the same as R or a monovalent organic radical of from 2 to 20 carbon atoms having epoxy functionality. The epoxy-silicone polymer may have up to about 20% by weight epoxy-functional groups and must be capable of curing, or cross-linking, when combined with a suitable photoinitiator and exposed to ultraviolet radiation. The cured polymeric composition must be of a lower or higher refractive index than the optical fiber core and exhibit flexibility, loose adhesion to the core fiber, and environmental stability.

Preferred epoxy-functional polydiorganosiloxanes contemplated by the present invention are more specifically dialkylepoxy-chainstopped polydialkyl-alkylepoxysiloxane copolymers wherein the polysiloxane units contain lower alkyl substituents, notably, methyl groups. The epoxy functionality is obtained when certain of the hydrogen atoms on the polysiloxane chain of a polydimethyl-methylhydrogensiloxane copolymer are reacted in a hydrosilation addition reaction with other organic molecules which contain both ethylenic unsaturation and epoxide functionality. Ethylenically unsaturated species will add to a polyhydroalkylsiloxane to form a functionalized polymer in the presence of catalytic amounts of a precious metal catalyst. Such a reaction is the cross-linking mechanism for other silicone compositions, however, in the present invention, a controlled amount of such cross-linking is permitted to take place in a silicone precursor fluid or intermediate, and this is referred to as "pre-crosslinking". Pre-crosslinking of the precursor silicone fluid means that there has been partial cross-linking or cure of the composition and offers the advantages to the present invention of enabling swift UV-initiated cure with little expense for energy and elimination of the need for a solvent.

The UV-curable epoxy-functional silicone intermediate fluid comprises a pre-crosslinked epoxy-functional dialkylepoxy-chainstopped polydialkyl-alkylepoxy silicone copolymer fluid which is the reaction product of a vinyl- or allylic-functional epoxide and a vinyl-functional siloxane crosslinking fluid having a viscosity of approximately 1 to 100,000 centipoise at 25° C. with a hydrogen-functional siloxane precursor fluid having a viscosity of approximately 1 to 10,000 centipoise at 25° C. in the presence of an effective amount of precious metal catalyst for facilitating an addition cure hydrosilation reaction between the vinyl-functional crosslinking fluid, vinyl-functional epoxide, and hydrogen-functional siloxane precursor fluid.

The unsaturated epoxides contemplated are any of a number of aliphatic or cycloaliphatic epoxy compounds having olefinic moieties which will readily undergo addition reaction to ≡SiH-functional groups. Examples of such compounds include 1-methyl-4-isopropenyl cyclohexeneoxide (limoeneoxide; SCM Corp.); 2,6-dimethyl 2,3-epoxy-7-octene (SCM Corp.) and 1,4-dimethyl-4-vinylcyclohexeneoxide (Viking Chemical Co.). Limoneneoxide is preferred.

The precious metal catalyst for the hydrosilation reactions involved in the present invention may be selected from the group of platinum-metal complexes which includes complexes of ruthenium, rhodium, palladium, osmium, iridium and platinum. Examples of such hydrosilation catalysts suitable for the purposes herein are described in U.S. Pat. No. 3,220,972 (Lamoreaux), U.S. Pat. No. 3,715,334 (Karstedt), U.S. Pat. No. 3,775,452 (Karstedt) and U.S. Pat. No. 3,814,730 (Karstedt), all of which are incorporated herein by reference.

In the present invention, the vinyl-functional siloxane crosslinking fluid can be selected from the group consisting of dimethylvinyl-chainstopped linear polydimethylsiloxane, dimethylvinyl chainstopped polydimethyl-methylvinyl siloxane copolymer, tetravinyltetramethylcyclotetrasiloxane and tetramethyldivinyldisiloxane. The hydrogen-functional siloxane precursor fluid can be selected from the group consisting of tetrahydrotetramethyl-cyclotetrasiloxane, dimethylhydrogenchainstopped linear polydimethylsiloxane, dimethylhydrogenchainstopped polydimethyl-methylhydrogen siloxane copolymer and tetramethyldihydrodisiloxane.

Preferred photoinitiators for the epoxy-functional base polymers of the present invention include iodonium salts having the general formula,

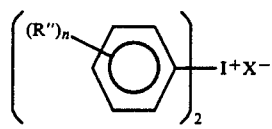

wherein X is selected from SbF$_6$, AsF$_6$, PF$_6$, or BF$_4$ and wherein R" is a monovalent alkyl or haloalkyl radical of from 4 to 20 carbon atoms and n is a whole number equal to 1 to 5, inclusive. These compounds have been found to be highly efficient in promoting the UV-initated cationic ring-opening curing mechanism for epoxy-functional polysiloxanes, as disclosed in U.S. Pat. No. 4,279,717 (Eckberg et al.), incorporated herein by reference.

Preferred of the iodonium salt photoinitiators utilized with the epoxy-functional silicones of the present invention are diaryl iodonium salts derived from "linear alkylate" dodecylbenzene. Such salts have the general formula,

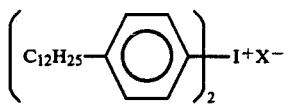

wherein X equals SbF$_6$, AsF$_6$, PF$_6$ or BF$_4$. These bis(4-dodecylphenyl) iodonium salts are very effective initiators for the UV cure of a wide variety of epoxy-functional silicones.

"Linear alkylate" dodecylbenzene is known commercially and is prepared by Friedel-Craft alkylation of benzene with a C$_{(11-13)}$ α-olefin cut. Consequently, the alkylate contains a preponderance of branched chain dodecylbenzene, but there may in fact be large amounts of other isomers of dodecylbenzene such as ethyldecylbenzene, plus isomers of undecylbenzene, tridecylbenzene, etc. Note, however, that such a mixture is responsible for the dispersive character of the linear alkylate-derived catalyst and is an aid in keeping the material fluid. These catalysts are free-flowing, viscous fluids at room temperature.

The preferred bis(dodecylpheyyl) iodonium salts are alkane-soluble and water-insoluble, and they disperse well in the preferred epoxy-functional polysiloxanes utilized in the coating compositions of the present invention. Bis(4-n-tridecylphenyl) iodonium hexafluoroantimonate and bis(4-n-dodecylphenyl) iodonium hexafluoroantimonate are most preferred.

The vinyl-functional base polymers contemplated herein are actually photoreactive terpolymers capable of curing on exposure to UV radiation in the presence of certain radical photoinitiators. The terpolymers are mixed dimethylvinyl- and trimethyl-chainstopped linear polydimethyl-methylvinyl-methylhydrogensiloxane terpolymer fluids and can be synthesized by acid equilibration of polymethylhydrogen siloxane fluid, tetramethyltetravinylcyclotetrasiloxane (methylvinyl tetramer) and octamethylcyclotetrasiloxane (dimethyl tetramer).

These vinyl-functional terpolymers are curable in the presence of polyaromatic photosensitizers having at least two benzene rings which may be fused or bridged by organic radicals or hetero-radicals such as oxa, thio, and the like. Preferred among these photo-sensitizers are benzophenone and t-butylanthraquinone.

The terpolymers may also be cured in the presence of certain perbenzoate esters having the general formula:

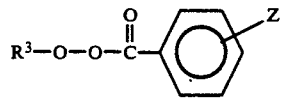

where R$^3$ is a monovalent alkyl or aryl group and Z is hydrogen, alkoxy, alkyl, halogen, nitro, amino, primary and secondary amino, amido, and the like. The nature of Z will affect the stability of the peroxy bond, and electron-poor substitutent stabilizing the peroxy bond, and an electron-rich substituent making the peroxy bond more reactive. Preferred perbenzoate esters include t-butylperbenzoate and its para-substituted derivatives, including t-butylper-p-nitrobenzoate, t-butylper-p-methoxybenzoate, t-butylper-p-methylbenzoate, and t-butylper-p-chlorobenzoate. The photoreactive polysiloxane terpolymers of the present invention, and photoinitiators effectively used therewith, are disclosed in U.S. Pat. No. 4,558,147, filed concurrently herewith, incorporated herein by reference.

The amount of photoinitiator employed is not critical, so long as proper curing is effected. As with any catalysts, it is preferable to use the smallest effective amount possible; however, for purposes of illustration, catalyst levels of the aforementioned compounds from about 1% to 5% by weight have been found suitable. Combinations of photoinitiators are also contemplated.

The epoxy-functional and vinyl-functional polysiloxanes described above typically have a low refractive index, i.e., less than 1.47, where the non-epoxy or nonvinyl substituents along the siloxane polymer chain are hydrogen or lower alkyl. The refractive index of the polysiloxanes can be raised by formulating polymers which also contain diphenylsiloxy units.

As discussed previously, an epoxy-functional polydiorganosiloxane may be obtained by reacting a vinyl-functional epoxide with a SiH-containing polydiorganosiloxane, such as polydimethyl-methylhydrogen siloxane copolymer. To achieve a higher refractive index, a diphenylsiloxy-containing and SiH-containing polysiloxane can be synthesized by co-hydrolysis of diphenyldichloro silane, dimethyldichloro silane, and methylhydrogendichloro silane, and this polymer could theoretically be reacted with a vinyl-functional epoxide to obtain epoxy functionality on the polymer. However, small quantities of acid residues associated with, and very difficult to remove from, such linear high-phenyl SiH polymers act to open the oxirane ring of the epoxides, resulting in polysiloxanes which are not photoreactive. A further difficulty with this approach is that in order to raise the refractive index above 1.50, the polymer must contain more than 30 mole percent (greater than 50 weight percent) diphenylsiloxy units, making the high-phenyl polysiloxanes very costly.

An important feature of the present invention is the discovery of a cost-effective way to produce UV-curable epoxy-functional silicones having a refractive index greater than 1.47, making the present compositions suitable for a wider range of fiber optic coating applications. In preferred features of the invention, high refractive index compositions are prepared by reacting a SiH-containing polysiloxane with both a vinyl-functional aromatic compound of from 1 to 20 carbon atoms (to obtain on-chain aromatic substituents) and vinyl-functional epoxides (to obtain epoxy-functional substituents).

The vinyl-functional aromatic compound contains at least one aromatic ring and at least one aliphatically unsaturated site capable of reacting via hydrosilation addition with an SiH group to form a carbon-silicon bond. Ethenylbenzene (styrene) is most preferred, however many other vinyl aromatic compounds will suggest themselves to persons skilled in this art, and these are intended to be included herein.

In reactions with SiH-containing polysiloxanes, the vinyl aromatic compound and the unsaturated epoxide may be introduced simultaneously (and compete for hydride reaction sites) or, preferably, in tandem, which allows more control over the degree of epoxy functionality and refractive index of the final product. Since raising the refractive index of the composition is the chief purpose of employing such vinyl aromatic compounds, reacting these compounds first and adding epoxy functionality second is most preferred. The exact relative amounts of vinyl aromatic compound and vinyl-functional epoxide employed will vary over a wide range, depending on the refractive index desired and the degree of reactivity desired. By judicious selection of the reactants, their amounts, and the reaction conditions, high refractive index epoxy-functional silicones which are tailored to specific requirements may be produced. In view of this, simple experimentation with the processing perameters is contemplated.

Combination of the iodonium salt photoinitiators with other known photoinitiators is also comtemplated. Preferred among such catalyst blends are combinations of iodonium salts with free-radical photoinitiators such as acetophenone derivatives. Even (1:1) blends of diaryl iodonium salts with diethoxy acetophenone are most preferred.

The present UV-curable silicone coating compositions are applied to the optical fibers by methods well known in the art. Typically, for example, uncoated optical fibers are drawn through a coating solution and then in-line through a curing chamber. As discussed above, the curing step has been found heretofore to be the limiting factor in the speed at which the coating operation can be performed. Use of epoxy-functional silicone coating compositions cured by brief exposure to ultraviolet radiation in accordance with the present discovery provides a flexible, loosely adherent, environmentally stable primary coating on the silica glass core fiber which can be applied at increased line speeds and without subjecting the coating material or fiber of high oven temperatures.

With the increased line speeds made possible with the compositions of the present invention, it has been discovered (see, i.e., Examples 1–3, infra.) that the viscosity of the coating compositions becomes an additional property which the industrial producer of optical fibers must be concerned with. In general, it is seen that viscosities below about 1000 cps do not permit "wetting" (coating) of the fiber where the production speed is high; at viscosities greater than about 10,000 cps, entrainment of air bubbles in the coating occurs, leading to imperfections in the primary coating that cause signal attenuation.

For the epoxy-functional silicones produced via hydrosilation addition of vinyl-functional epoxides to an SiH-containing polysiloxane, the viscosity of the final product has been hard to predict, as it is dependent not only on the viscosity of the SiH-containing precursor but also on the degree of epoxy functionality. For example, a 90 cps precursor fluid containing 10 weight percent methylhydrogensiloxy units converted to an epoxy-functional silicone incorporating 18 weight percent limoneneoxide has a viscosity of about 400 cps; while a 200 cps precursor fluid containing 10 weight percent methylhydrogensiloxy units converts to an epoxy-functional silicone of 3,000 cps viscosity. And a 200 cps precursor fluid containing 6 weight percent methylhydrogensiloxy units incorporating 11.7 weight percent limoneneoxide has a viscosity of 1000 cps.

It has now been discovered that simultaneous addition of a vinyl MQ silicone resin and the vinyl-functional epoxide to a given SiH-containing polysiloxane provides products where the viscosity is dependent on the resin content. The vinyl MQ resins contemplated are polysiloxanes having primarily monofunctional (M) units or tetrafunctional (Q) units. The vinyl groups of the resin compete with the vinyl-functional epoxide for available hydride sites in the polysiloxane. The resin is thereby incorporated into the epoxy-functional polysiloxane product.

The vinyl MQ resins are made up of M units having the formula $Y_3SiO_{\frac{1}{2}}$ and Q units having the formula $SiO_{4/2}$, with the ratio of M to Q units being roughly 0.5 to 1.0 and preferably about 0.65. The Y groups may be, independently, the same or different monovalent hydrocarbon radicals of no more than 2 carbon atoms, and at least 1 Y group must be vinyl. Such radicals include, for example, methyl, ethyl, vinyl or ethynyl. Methyl and vinyl are preferred. A general discussion of these resins is found in Chapters 1 and 6 of Noll, *Chemistry and Technology of Silicones* (2nd Ed., 1968).

In features of the present invention which make use of the foregoing discovery, the final UV-curable polysiloxane product will contain pendent siloxy groups corresponding to the incorporated MQ resins. For these polysiloxanes, the definition of the R' radical in the formulas described above would be expanded to include a branched organosiloxane radical comprised of from 1 to 200 Q siloxy units of the formula $SiO_{4/2}$ and M siloxy units having the formula $Y_3SiO_{\frac{1}{2}}$, wherein Y is a monovalent hydrocarbon radical of 1 or 2 carbon atoms. It is understood also that the terms "diorganopolysiloxane" and "organopolysiloxane base polymer" as used herein to describe the epoxy- and vinyl-functional polymer products of the invention are broad enough to cover such branched polysiloxane pendent groups.

Where high refractive index materials are desired, a further method for modifying the viscosity of the coating compositions, which also introduces refractive index-raising aromatic groups into the system, is to employ aromatic glycidyl ethers as reactive diluents. The aromatic glycidyl ether reactive diluents also provide additional epoxy functionality and so may enhance the curing characteristics of the present coating compositions, as was discovered for silicone paper release compositions by the addition of epoxy polymers in U.S. Pat. No. 4,576,999 which is incorporated herein by reference.

In order that persons skilled in the art may better understand the practice of the invention, the following examples are provided by way of illustration, and not by way of limitation.

EXAMPLES 1-3

Three epoxy-functional silicone coating compositions were prepared for optical fiber coating trials as follows:

Sample 1

5 parts by weight of a 250 cps dimethylvinylchain-stopped polydimethylsiloxane fluid, 320 parts by weight of limoneneoxide, and 1 part by weight of a platinum catalyst (platinum-octyl alcohol complex) were added to 1,000 parts by weight of toluene. 1,000 parts by weight of a 150 cps dimethylhydrogen-chainstopped polydimethyl-methylhydrogen siloxane copolymer fluid containing about 8.7 weight percent ≡SiH groups were added slowly to the stirring mixture at room temperature over 1 hour. The reaction mixture was then refluxed at 120° C. for 21 hours, at which point 30 parts by weight of n-hexene were added and refluxing continued for 4 hours more. The solvents were stripped under a vacuum at 130° C. to yield a 1,000 cps limoneoxide-functional polysiloxane fluid containing about 17.2 weight percent limoneneoxide groups.

Samples 2 & 3

Two other limoneneoxide-functional products designated Sample 2 and Sample 3 were prepared following the same procedure as for Sample 1, above. Sample 2 was a 680 cps fluid containing approximately 14.0 weight percent limoneneoxide groups; Sample 3 was a 700 cps fluid containing approximately 11.7 weight percent limoneneoxide groups.

All three compositions were combined with 1.5 weight percent of bis(dodecylphenyl) iodonium hexafluoroantimonate cationic photoinitiator.

Each coating composition was applied to 10 mil diameter pure silica glass fiber immediately after it was drawn. The coating device consisted of a small cup fitted with a 0.025-inch orifice at its base. Coating was accomplished by pulling the drawn optical fiber down through the test composition, then through the orifice to regulate coating thickness. The coated fiber was passed immediately through a nitrogen-inerted curing chamber where it was exposed to a single focused 300 watt, 10 inch long Fusion Systems "H" ultraviolet lamp. The coated fiber was finally wound on a take-up roll.

The coated fibers were observed to make sure the coating was fully cured. The line speed was gradually increased in order to determine the line speed at which the coating on the fiber would not cure completely, that is, in order to discover the point at which line speed surpassed cure rate.

With each of the samples studied, the coating compositions still cured completely at line speed at which the coating rate was surpassed. In other words, "wetting" (coating) of the optical fiber by the silicone fluids ceased at line speeds where complete curing was still observed. For the three sample compositions, complete curing was observed under the following conditions:

| Compositions | Loss of Wetting (meters/min.) | Coating Thickness (microns) |
| --- | --- | --- |
| Sample 1 | 50 | 125 |
| Sample 2 | 30 | 120 |
| Sample 3 | 33 | 120 |

These results compare favorably with the maximum line speed of approximately 30 meters per minute observed with commercially available heat-curable silicone systems.

EXAMPLES 4-7

600 pbw of linear 60 cps dimethylhydrogen-chain-stopped polydimethyl-methylhydrogensiloxane fluid containing 10 weight percent methylhydrogensiloxy units were dissolved in 600 pbw hexane. To this solution (containing 1.0 mole of active SiH groups) were added 152 pbw limoneneoxide (1 mole), about 25 ppm platinum in the form of a soluble complex catalyst, and varying levels of a vinyl MQ silicone resin. The reaction mixtures were refluxed for four hours, after which the unreacted SiH was removed by reaction with hexene. Stripping the solvents, unreacted limoneneoxide, and hexane under vacuum resulted in the following epoxy-functional polymers:

| Compositions | % Limoneneoxide* | % MQ resin** | Viscosity (cps) |
| --- | --- | --- | --- |
| Sample 4 | 19.6 | 0.0 | 340 |
| Sample 5 | 18.5 | 7.6 | 900 |
| Sample 6 | 14.3 | 11.5 | 1976 |
| Sample 7 | 16.1 | 12.8 | 3800 |

*Weight percent limoneneoxide incorporated in polymer.
**As weight percent resin solids after stripping solvents.

Cure was evaluated by blending 100 parts by weight (pbw) of each sample with 1.5 pbw diethoxy acetophenone and 1.5 pbw $(C_{12}H_{25}Ph)_2$ ISbF$_6$ (a free-radical/cationic co-catalyst system disclosed for curing epoxy-functional silicones in the aforementioned U.S. Pat. No. 4,576,999 incorporated herein by reference). The complete coating compositions were manually applied as 2 mil coatings on polyethylene kraft paper using an adhesive coater and exposed to two focused medium pressure mercury vapor ultraviolet lamps in a PPG 1202 ultraviolet processor. Cure was evaluated qualitatively at various conveyor speeds (varying exposure time), UV intensities, and cure environments, with the following results:

| Sample | UV Power (Watts) | Cure ATM | Line Speed (meters/sec) | Cure |
| --- | --- | --- | --- | --- |
| 4 | 400 | Air | 2.0 | Excellent cure-no smear, no migration, good adhesion |
| 4 | 300 | $N_2$ | 2.0 | Excellent cure-no smear, no |

-continued

| Sample | UV Power (Watts) | Cure ATM | Line Speed (meters/sec) | Cure |
|---|---|---|---|---|
| | | | | migration, good adhesion |
| 5 | 400 | Air | 2.0 | Excellent cure-no smear, no migration, good adhesion |
| 5 | 400 | $N_2$ | 2.5 | Excellent cure-no smear, no migration, good adhesion |
| 5 | 300 | $N_2$ | 2.5 | 'skin-cured' - easily rubbed off substrate |
| 6 | 400 | Air | 2.0 | Cured - fair adhesion to substrate |
| 6 | 400 | $N_2$ | 2.0 | Excellent cure - no smear - good adhesion |
| 7 | 400 | Air | 2.0 | Excellent cure - no smear, good adhesion |
| 7 | 400 | $N_2$ | 2.0 | Excellent cure - no smear, good adhesion |

It can be seen by comparisons with the control composition (Sample 4) that incorporation of vinyl MQ resins, while allowing formulation of epoxy-functional silicone compositions within a specific target viscosity range, does not make a significant qualitative difference in cure.

EXAMPLE 8

90 pbw of a 10,000 cps epoxy-functional polysiloxane incorporating 11.3 weight percent limoneneoxide were blended with 10 pbw of 1,2-epoxy dodecane (Vikolox ® 12, Viking Chemical Co.), resulting in a 4200 cps blend. The dual catalyst of Examples 4-7 was added and the complete composition applied to a 10 mil optical fiber by the same method as in Examples 1-3, above, up to a drawing speed of 60 meters/minute. At this speed, the coating became too thin (less than 80 microns) and the fiber entering the coating bath was so hot that thermal degradation (smoking) of the coating composition was apparent; however, the coating still cured at this speed on exposure to a 300 Watt UV source. These results indicate that using the compositions of the present invention, line speeds for production of optical fibers may be doubled with the proper formulation. In addition, it is evident from this example that the omega-epoxy $C_{(8-11)}$ aliphatic hydrocarbons preferred as cure-enhancing reactive diluents as disclosed in the aforementioned U.S. Pat. No. 4,576,999 (incorporated herein by reference) are useful as viscosity controlling agents for the optical fiber coating compositions herein.

EXAMPLES 9-12

200 pbw of a linear 75 cps trimethyl-chainstopped polydimethyl-methylhydrogensiloxane fluid having 44.9 weight percent methylhydrogensiloxy units (1.5 moles of active SiH groups) were disbursed in 400 pbw hexene with 126 pbw styrene (1.27 moles). 0.35 pbw platinum catalyst were added, the reaction mixture was agitated and slowly heated to 60° C., at which point an exotherm occurred, taking the temperature to 75° C. before falling back to around 65° C., where is was maintained for 1 hour. Infrared analysis showed 0.23 moles unreacted SiH, indicating that essentially complete addition of the styrene had taken place. 60 pbw limoneneoxide were then added (0.4 moles) and the reaction mixture returned to 69° C. and maintained at this temperature, with agitation, for 64 hours. The product exhibited only 0.0007 moles of unreacted SiH, which was removed by brief reaction with hexene. The solvents and unreacted monomers were stripped to yield a viscous fluid product (11,680 cps) having a refractive index of 1.492. This fluid, designated Sample 9, incorporated 33.0 weight percent styrene and 13.1 weight percent linomeneoxide. Three other compositions were prepared in similar fashion to give the following:

| Compositions | Weight % Styrene | Weight % Limoneneoxide | Viscosity (cps) | Refractive Index |
|---|---|---|---|---|
| Sample 9 | 33.0 | 13.1 | 11,680 | 1.4920 |
| Sample 10 | 32.9 | 14.4 | 3,100 | 1.4902 |
| Sample 11 | 29.1 | 29.1 | 88,000 | 1.4930 |
| Sample 12 | 31.8 | 22.1 | 21,000 | 1.4970 |

Blends of the above polymers with cresyl glycidyl ether (DY 023, Ciba Geigy) were prepared to yield the following compositions:

| Compositions | Weight % DY 023 | Viscosity (cps) | Refractive Index |
|---|---|---|---|
| Sample 9A | 20.0 | 1,200 | 1.4990 |
| Sample 10A | 25.0 | 2,500 | 1.4992 |
| Sample 11A | 25.0 | 3,600 | 1.5080 |
| Sample 12A | 25.0 | 1,680 | 1.5030 |

The UV cure characteristics of the above β-phenethyl- and limoneneoxide-substituted polysiloxane fluids described above were qualitatively tested by adding 4 weight percent of a 1:1 blend of diethoxyacetophenone and $(C_{12}H_{25}Ph)_2ISbF_6$, coating the catalyzed mixtures onto polyethylene kraft substrates and then exposing the coated substrates to UV radiation as described previously.

The following results were observed:

| Sample | Total Lamp Power (Watts) | Coating Thickness (Mils) | Cure Atmosphere | Line speed, (meters/sec.) | Cure |
|---|---|---|---|---|---|
| 9 | 400 | 23 | $N_2$ | 1.0 | Excellent cure to glossy surface - no smear, good anchorage. Coating fairly soft. |
| 9 | 600 | 2 | AIR | 2.0 | Excellent cure to glossy surface - no smear, good anchorage. Coating fairly soft. |
| 9A | 600 | 2 | AIR | 2.0 | Excellent cure to glossy surface - no smear, good anchorage. Coating fairly soft. |
| 10A | 400 | 4 | AIR | 1.0 | Cure confined to surface - poor anchorage resulted. |
| 10A | 400 | 2 | AIR | 1.0 | Excellent cure to glossy surface, no smear, good anchorage. |
| 10 | 400 | 2 | AIR | 1.0 | Cured to soft, glossy coating - no smear, good anchorage. |

| Sample | Total Lamp Power (Watts) | Coating Thickness (Mils) | Cure Atmosphere | Line speed, (meters/sec.) | Cure |
|---|---|---|---|---|---|
| 11A | 600 | 4 | AIR | 2.0 | Excellent cure - hard, glossy coating, no smear, excellent anchorage. |
| 12A | 600 | 2 | AIR | 2.0 | Excellent cure - hard, glossy coating, no smear, excellent anchorage. |

It was observed that the diaryl salt catalyst was much more soluble in the β-phenethyl epoxy-functional silicones than in the low refractive index epoxy-functional silicones described in prior examples. This would permit higher concentrations of the catalyst if needed for faster cure. In addition, the presence of β-phenethyl substituents evidently affords fast cure with lower epoxy loads, and the above-described ether blends evidently cure equally well in air or inert atmospheres, making the high refractive index compositions very efficient coating materials.

A high cure speed can be maintained with as much as 25% of the cresyl glycidyl ether present. Other aromatic epoxy monomers such as bisphenol A diglycidyl ether or epoxy novolak resins are expected to be compatible with the epoxy-functional silicones as well.

EXAMPLE 13

A low refractive index (below 1.43) polysiloxane composition was prepared as follows:

60 pbw of a trimethyl-chainstopped polydimethyl hydrogen siloxane fluid (25 cps), 84 pbw sym-tetramethyltetravinylcyclotetrasiloxane, and 1056 pbw octamethylcyclotetrasiloxane were agitated for 17 hours under a nitrogen atmosphere at 100° C. in the presence of 6 pbw Filtrol ® 20 acid equilibration catalyst. 6 pbw of MgO were added to neutralize the acid and the mixture held an additional hour at 100° C., at which point the neutralized reaction product was stripped at 165° C. under 48 mm Hg vacuum for hours. 829 pbw of the fluid product were treated with 0.8 pbw benzophenone, stirred for 75 minutes at 70° C., then cooled to below 50° C. 40 pbw t-butylperbenzoate were added and the complete mixture stirred 10 minutes before filtering to remove the solid Filtrol ® and MgO, giving a 1800 cps fluid product.

The composition was applied to polyethylene kraft paper at a 2 mil thickness, then exposed to 400 watts total UV lamp power in a PPG 1202 processor. Curing at different line speeds afforded the following results:

| Line Speed | Curing ATM | Cure |
|---|---|---|
| 50 ft/min. | AIR | Some smear, otherwise well cured |
| 100 ft/min. | N$_2$ | Well cured to smear-free coating; thick section cured OK |
| 200 ft/min. | N$_2$ | Slight smear detected, but otherwise satisfactory |
| 300 ft/min. | N$_2$ | Partially cured - easily smeared and rubbed off |
| 400 ft/min. | N$_2$ | Surface cure only ("skin" formed) |

The same composition was applied to a 10 mil diameter optical fiber as described previously, then cured by exposure to a single Fusion Systems 300 Watt "H" lamp in an inert atmosphere. The material wetted the fiber satisfactorily up to a drawing speed of about 35 meters/minute. A well-cured 140 micron thick coating was obtained. At greater speeds, coating thickness rapidly diminished, although the material appeared to cure completely at speeds above 40 meters/minute.

It is expected that high refractive index vinyl-functional polymers, UV-curable in the presence of perbenzoate catalysts, may be prepared, in accordance with disclosure herein, which are comprised of four different units, e.g., methylvinyl-, diphenyl-, dimethyl-, and methylhydrogen-siloxy units.

EXAMPLE 14

300 pbw styrene (2.88 moles) were added to 800 pbw toluene and a platinum complex catalyst (furnishing 25 ppm platinum to the complete mixture). The solution was heated to 80° C., at which point 400 pbw trimethyl-chainstopped linear polydimethyl-methylhydrogensiloxane fluid (21 cps viscosity) having 69 weight percent methylhydrogensiloxy units (4.61 moles SiH total) were slowly added over a 4 hour period as the reaction mixture was held at a temperature of 81°–84° C. After stirring a ¼ hour, 289 pbw limoneneoxide (1.9 moles) were added and the reaction mixture refluxed at 82° C. for 17 hours, then 90° C. for 22 hours, at which point unreacted SiH-containing units were down to about 2.4 weight percent. Unreacted SiH was removed by reaction with hexane, and the product was stripped at 140° C. under vacuum for 40 minutes to yield 888 pbw of a 18,800 cps fluid. Assuming quantitative addition of styrene, the product, designated Sample 14, included 31.9 weight percent styrene and 25.4 weight percent limoneneoxide. The refractive index of this material was 1.503.

Coating compositions of suitable viscosities were prepared by blending Sample 14 with various epoxy-functional reactive diluents selected from the following:

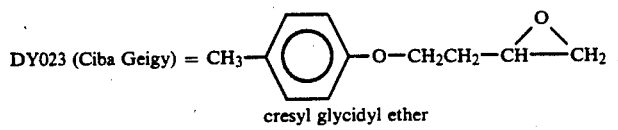

cresyl glycidyl ether

CY179 (Ciba Geigy) = 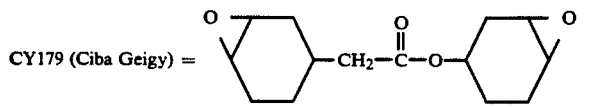

EPON ® 825 (Shell Chemicals) = 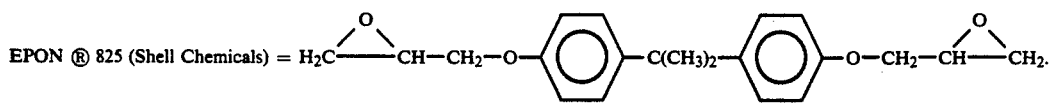

Each composition was catalyzed with 5 weight percent of a 1:1 blend of diethoxyacetophenone and $(C_{12}H_{25}Ph)_2ISbF_6$; the formulations are outlined below:

| Compositions | DY023 (Wt. %) | CY179 (Wt. %) | Epon ® 825 (Wt. %) | Refractive Index |
| --- | --- | --- | --- | --- |
| 14A | 10 | 10 | — | 1.506 |
| 14B | 10 | — | 10 | 1.513 |
| 14C | 20 | — | 20 | 1.518 |

The compositions were coated on polyethylene kraft substrates at a coating thickness of 1 mil, then cured in a PPG QC1202AN processor as previously described. The cure performance was recorded as follows:

| Compositions | Atm. | UV Power (Watts) | Line Speed (meters/sec.) | Cure |
| --- | --- | --- | --- | --- |
| Sample 14 | Air | 400 | 1.0 | Excellent cure, good anchorage. |
| Sample 14 | Air | 600 | 2.0 | "Skin-cure" |
| Sample 14 | Air | 600 | 2.0 | Excellent cure, good anchorage. |
| Sample 14A | Air | 400 | 1.5 | Excellent cure. |
| Sample 14A | Air | 400 | 2.0 | Surface cure only. |
| Sample 14A | $N_2$ | 400 | 2.0 | Surface cure only. |
| Sample 14A | Air | 600 | 2.5 | Excellent cure. |
| Sample 14B | Air | 400 | 1.5 | Excellent cure, good anchorage. |
| Sample 14B | Air | 400 | 2.0 | Evidence of surface cure. |
| Sample 14B | Air | 600 | 2.0 | Excellent cure. |
| Sample 14C | Air | 400 | 1.5 | Smear-free, good anchorage. |
| Sample 14C | Air | 400 | 2.0 | Surface cure only. |
| Sample 14C | Air | 600 | 2.5 | Excellent cure. |

Modifications and variations in the present invention are obviously possible in light of the foregoing disclosure. For instance, it is anticipated that limonenedioxide (or other polyepoxide monomers) will prove to be a useful epoxy-functional diluent for high refractive index epoxy-functional polysiloxane compositions in light of the working examples. Also, modifications of the epoxy-functional or vinyl-functional polysiloxane compositions described herein with additives to enhance the curing characteristics, such as disclosed in commonly assigned U.S. Pat. Nos. 4,576,999 and 4,558,147 both incorporated herein by reference, may be advantageous in particular situations. It is understood, however, that these and other incidental changes in the particular embodiments of this invention are within the full intended scope of the appended claims.

What is claimed is:

1. A method for high-speed production of a coated optical fiber comprising:
   (1) Applying to a core fiber of high transparency silica glass an ultraviolet radiation-curable silicone coating composition comprising (i) a diorganopolysiloxane comprising units of the formula RR'SiO, wherein R is hydrogen or a monovalent hydrocarbon radical of from 1 to 8 carbon atoms and R' is hydrogen, a monovalent hydrocarbon radical of from 1 to 20 carbon atoms or a monovalent organic radical of from 2 to 20 carbon atoms having epoxy or vinyl functionality, and (ii) a catalytic amount of a photoinitiator; and
   (2) Exposing said coated core fiber to ultraviolet radiation of sufficient intensity and for a sufficient period of time to cure said coating composition on said core fiber to form a flexible, loosely adherent, environmentally stable coating thereon, which coating is of a lower of higher refractive index than the core fiber.

2. The method of claim 1, wherein said diorganopolysiloxane is epoxy-functional and said photoinitiator comprises, alone or in combination with a free-radical photoinitiator, an iodonium salt having the formula,

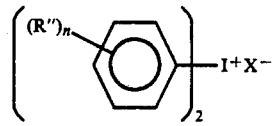

wherein X is selected from the group consisting of $SbF_6$, $AsF_6$, $PF_6$, and $BF_4$ and wherein R" is a monovalent alkyl or haloalkyl radical of from 4 to 20 carbon atoms and n is a whole number equal to 1 to 5, inclusive.

3. The method of claim 2, wherein said diaryl iodonium salt is a bis(dodecylphenyl) iodonium salt.

4. The method of claim 2, wherein the photoinitiator is a combination of a bis(dodecylphenyl) iodonium salt and diethoxyacetophenone.

5. The method of claim 2, wherein said diorganopolysiloxane has up to about 20% by weight epoxy-functional groups.

6. The method of claim 5, wherein said epoxy-functional groups are limoneneoxide groups.

7. The method of claim 5, wherein said diaryl iodonium salt is selected from bis(4-n-tridecylphenyl) iodonium hexafluoroantimonate and bis(4-n-dodecylphenyl) iodonium hexafluoroantimonate.

8. The method of claim 1, wherein the application step (1) is accomplished by drawing the core fiber through a mass of said silicone coating composition and immediately thereafter through an orifice which regulates the coating thickness, and said exposure step (2) is accomplished continuously with step (1) by drawing the coated fiber through a curing chamber equipped with an ultraviolet radiation source immediately after the coating step (1).

9. The method of claim 2, wherein said radical R' of the diorganopolysiloxane may also be a monovalent branched organosiloxane derived from a vinyl MQ resin.

10. The method of claim 2, wherein said coating composition also contains a component (iii) as amount sufficient to lower the viscosity of a reactive diluent selected from polyepoxide monomers or aromatic glycidyl ethers.

11. The method of claim 10, wherein said reactive diluents are selected from the group consisting of limonenedioxide,

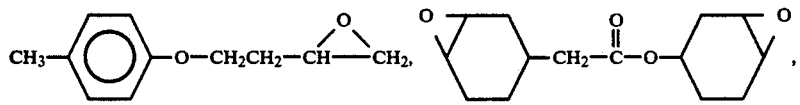

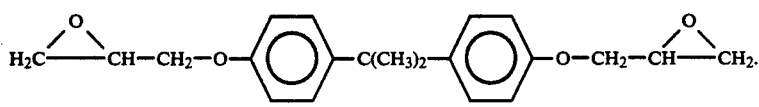

12. The method of claim 1, wherein the coating has a higher refractive index than the silica glass, and said diorganopolysiloxane is comprised primarily of polymeric units of the formulae,

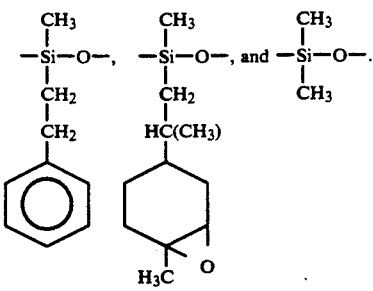

13. The method of claim 1, wherein said diorganopolysiloxane is a terpolymer comprised of dimethylsiloxy, methylhydrogensiloxy, and methylvinylsiloxy units.

14. The method of claim 13, wherein the photoinitiator is selected from the group consisting of perbenzoate esters and polyaromatic photosensitizers of up to 20 carbon atoms having at least two benzene rings which may be fused or bridged by an organic radical or heteroradical.

15. The method of claim 14, wherein the refractive index of the coating is greater than 1.5 and said diorganopolysiloxane also contains diphenylsiloxy units.

* * * * *